(12) United States Patent
Santamaria et al.

(10) Patent No.: US 8,480,900 B2
(45) Date of Patent: Jul. 9, 2013

(54) BUOYANT WATER HEATING DEVICE

(76) Inventors: Joseph P. Santamaria, Alexandria, NH (US); Bruce J. Zarozny, Shrewsbury, MA (US); Claude J. Chapdelaine, Leominster, MA (US)

(*) Notice: Subject to any disclaimer, the term of this patent is extended or adjusted under 35 U.S.C. 154(b) by 455 days.

(21) Appl. No.: 12/767,265

(22) Filed: Apr. 26, 2010

(65) Prior Publication Data

US 2010/0270235 A1 Oct. 28, 2010

Related U.S. Application Data

(60) Provisional application No. 61/173,023, filed on Apr. 27, 2009.

(51) Int. Cl.
*C02F 3/00* (2006.01)
*F24J 2/00* (2006.01)

(52) U.S. Cl.
USPC .......... 210/601; 210/175; 210/242.1; 165/86; 126/561

(58) Field of Classification Search
USPC ............... 210/601, 612, 175, 242.1; 165/67, 165/86; 126/565, 561, 568
See application file for complete search history.

(56) References Cited

U.S. PATENT DOCUMENTS

| 3,501,381 | A | * | 3/1970 | Delano | 202/83 |
| 3,598,104 | A | * | 8/1971 | Trostler | 126/566 |
| 3,893,443 | A | * | 7/1975 | Smith | 126/565 |
| 3,949,095 | A | * | 4/1976 | Pelehach et al. | 126/565 |
| 4,022,187 | A | * | 5/1977 | Roberts | 126/565 |
| 4,154,684 | A | * | 5/1979 | Tokarz | 210/242.1 |
| 4,243,022 | A | * | 1/1981 | Pedone | 126/675 |
| 4,366,806 | A | * | 1/1983 | Acker | 126/565 |
| 4,458,668 | A | * | 7/1984 | Sheldon | 126/565 |
| 4,756,300 | A | * | 7/1988 | Ewers | 126/567 |
| 5,216,762 | A | * | 6/1993 | Denny | 4/498 |
| D534,488 | S | * | 1/2007 | Rosene et al. | D13/102 |
| 2006/0283443 | A1 | * | 12/2006 | Rosene et al. | 126/565 |
| 2010/0282240 | A1 | * | 11/2010 | Hare | 126/565 |

FOREIGN PATENT DOCUMENTS

JP 57-159594 A * 3/1981

* cited by examiner

*Primary Examiner* — Fred Prince
(74) *Attorney, Agent, or Firm* — ZIP Law PLLC; Claire Zopf (57) ABSTRACT

A buoyant water heating device that may be used in a natural setting, such as a pond or lake, or in a man-made water-containing apparatus, such as a pool or water-treatment lagoon. The device comprises a water-filled, generally cylindrical anchor member coupled to a hollow, generally annular base member, and may he used alone or in combination with multiple other devices to create a free-floating blanket on the surface of the water. The device absorbs solar energy to heat water external to the device, and also provides a layer of thermal insulation between the water and the air above the device.

11 Claims, 12 Drawing Sheets

BUOYANT WATER HEATING DEVICE

FIELD OF THE INVENTION

The invention relates generally to the field of water or liquid heaters. More particularly, the invention relates to a solar heating device intended to float on a body of water or other liquid.

BACKGROUND OF THE INVENTION

Water heaters are used in pools, ponds and other bodies of water or liquid for a variety of reasons, such as providing a comfortable water temperature for swimming, preventing or slowing the formation of ice on the water's surface, or promoting the growth of beneficial microorganisms in wastewater treatment lagoons or ponds.

Flexible covers made of heat-absorbing materials may be used to raise the temperature of a body of water by capturing the heat of the sun and transferring it to the water beneath, although they have limitations. For example, in most cases the specific gravity of the water is less than the specific gravity of the cover material, and the cover will sink below the surface of the water without proper support. Another disadvantage of these covers is that they restrict access to the water, making them unsuitable for natural settings. These covers may also be unwieldy and cumbersome to remove and replace, and difficult to store.

Electrically-operated heaters may be effective in some circumstances, but may be costly to operate and potentially dangerous, particularly if the heating element is unshielded. In addition, it may be practically impossible to heat a large area with such a device, requiring multiple individual units.

There is a need in the art, then, for a cost-effective device that utilizes solar energy to increase the temperature of a body of water. Such a device should also be easy to use, and easy to remove and store. In addition, such a device should allow access to the water even when in use.

SUMMARY OF THE INVENTION

The invention provides an improved buoyant water heating device that is intended to float on the surface of a body of water or other liquid to capture solar energy and transfer it to the water or liquid in contact with the device.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
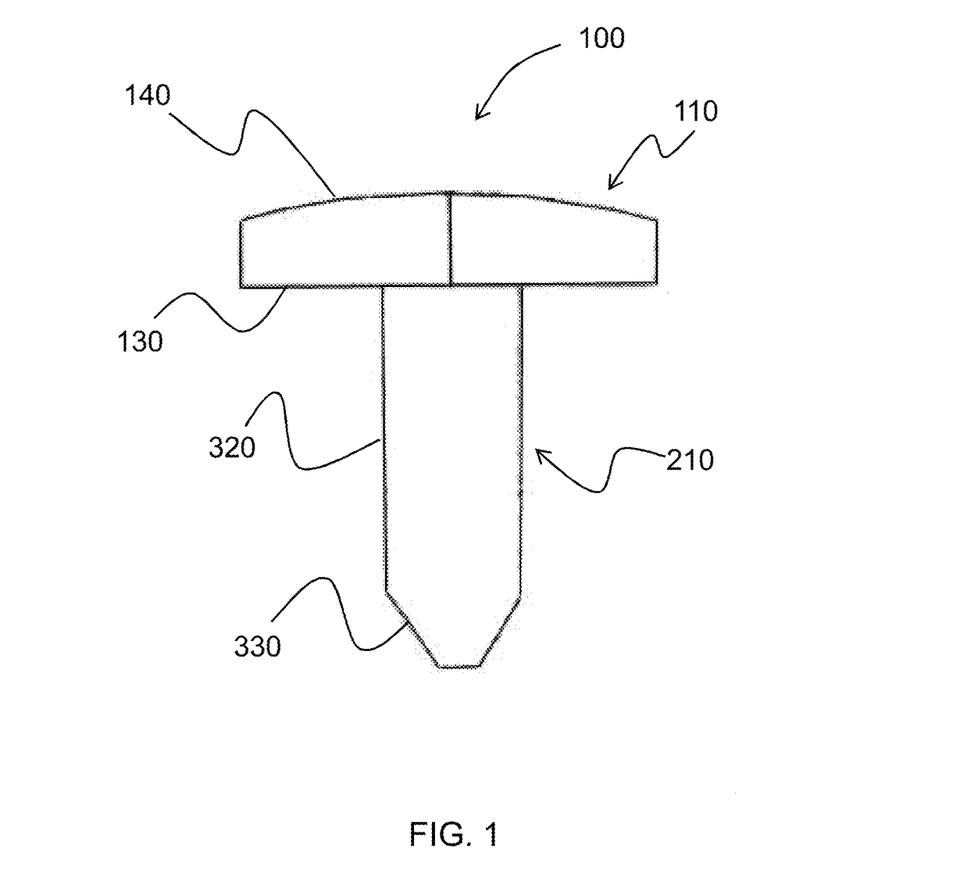
FIG. 1 is a front view of a preferred embodiment of a buoyant water heating device constructed in accordance with the present invention.
Figure 2:
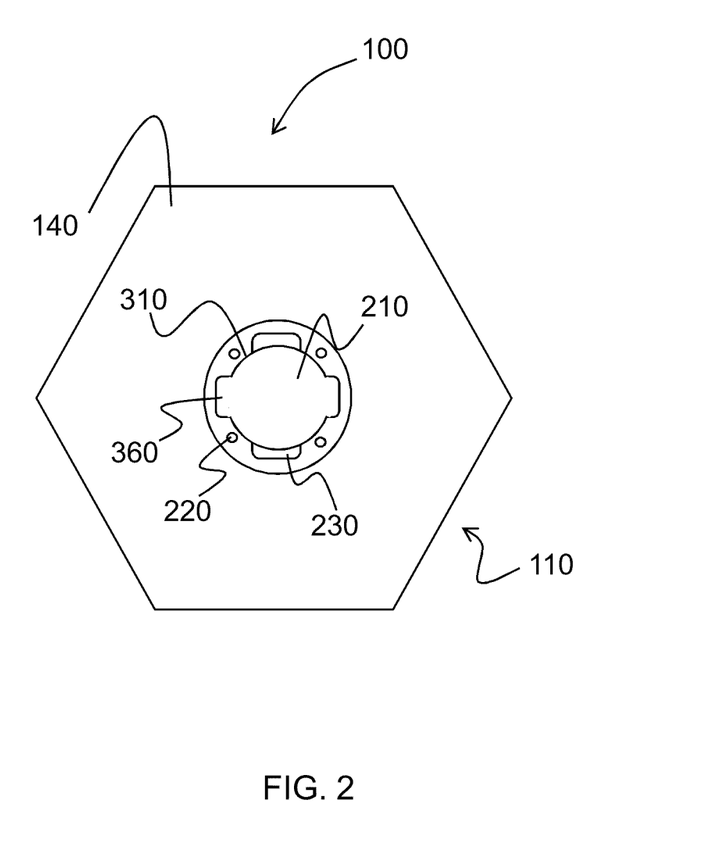
FIG. 2 is a top view of the buoyant water heating device of FIG. 1.

With reference to FIG. 1, the buoyant water heating device 100 may be used in a natural setting, such as a pond or lake, or in a man-made water-containing apparatus, such as a pool or water-treatment lagoon. Buoyant water heating device 100 comprises a hollow, liquid-tight, floating, generally annular base member 110 coupled to a generally cylindrical anchor member 210. Device 100 may be used alone, or in combination with other buoyant water heating devices 100. Multiple devices 100 may be used simultaneously to create a free-floating blanket on the surface of the water or other liquid.

Base member 110, because it is hollow, provides buoyancy for device 100 and keeps device 100 afloat when placed in a liquid, such as water. Base member 110 retains thermal energy in the water by providing a layer of thermal insulation between the water and the air above the buoyant water heating device 100. In addition, base member 110 absorbs solar energy from the sun to warm the water in contact with the buoyant water heating device 100. Anchor member 210 fills with water when placed in the water to provide a weight sufficient to inhibit the buoyant water heating device 100 from blowing away.

With further reference to FIGS. 1 and 3A-3E, base member 110 preferably comprises a top surface 140 and a bottom surface 130. Bottom surface 130 is generally flat, while top surface 140 has a slightly domed or curved shape. The dome shape of top surface 140 helps the buoyant water heating device 100 to properly orient itself when placed in the water.

With further reference to FIGS. 2, and 4A-D, anchor member 210 preferably comprises a generally cylindrical center section 320, a generally frustoconical bottom section 330, and a generally cylindrical top section 310. In a preferred embodiment, top section 310 has a circumference that is less than the circumference of center section 320.

As shown in FIGS. 2, 3A-3E, and 4A-4D, base member 110 has a center hole 240 through which top section 310 of anchor member 210 is inserted. In a preferred embodiment, top surface 140 of base member 110 also comprises four generally circular protrusions 220 and two generally rectangular slots 230 that function to provide a snap fit with top section 310 of anchor member 210. With further reference to FIGS. 4A-D, top section 310 of anchor member 210 comprises two generally rectangular protrusions 360. To couple base member 110 and anchor member 210 together, top section 310 of anchor member 210 is inserted through center hole 240 of base member 110 from the bottom surface 130 of base member 110. Protrusions 360 in anchor member 210 fit through slots 230 in base member 110. Anchor member 210 is then rotated approximately one-quarter turn to move rectangular protrusions 360 over circular protrusions 220 to releasably couple anchor member 210 to base member 110.

With further reference to FIGS. 4A-D, first port or hole 370 is located in the approximate center of bottom section 330 of anchor member 210. A second port or hole 380 is located in the approximate center atop section 310. When the buoyant water heating device 100 is placed in the water, water flows into first port 370, and air is exhausted out second port 380. Conversely, when the buoyant water heating device 100 is removed from the water, water exits from first port 370, replaced by air entering through second port 380. The diameters of each of the ports 370 and 380 may be adjusted or a flow-control adaptor may be installed in a port to vary the rate at which anchor member 210 fills and/or empties with water. The volume of water in anchor member 210 may be adjusted by changing the length and/or circumference of center section 320. In general, the volume of water required in anchor member 210 should be relative to the volume of air in base member 110, to stabilize the buoyant water heating device 100 in the water. In operation, water in anchor member 210 is heated by the solar energy absorbed by base member 110, and at least a portion of this heat is transferred to the water external to anchor member 210.

Figure 3A:
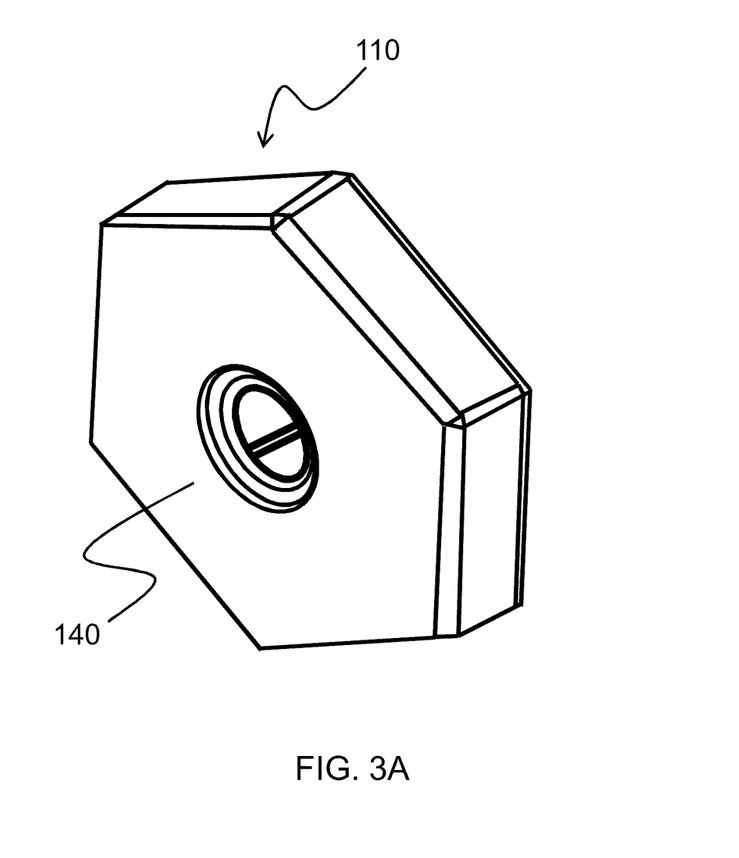
FIG. 3A is a top perspective view of the base member of the buoyant water heating device of FIG. 1.
Figure 3B:
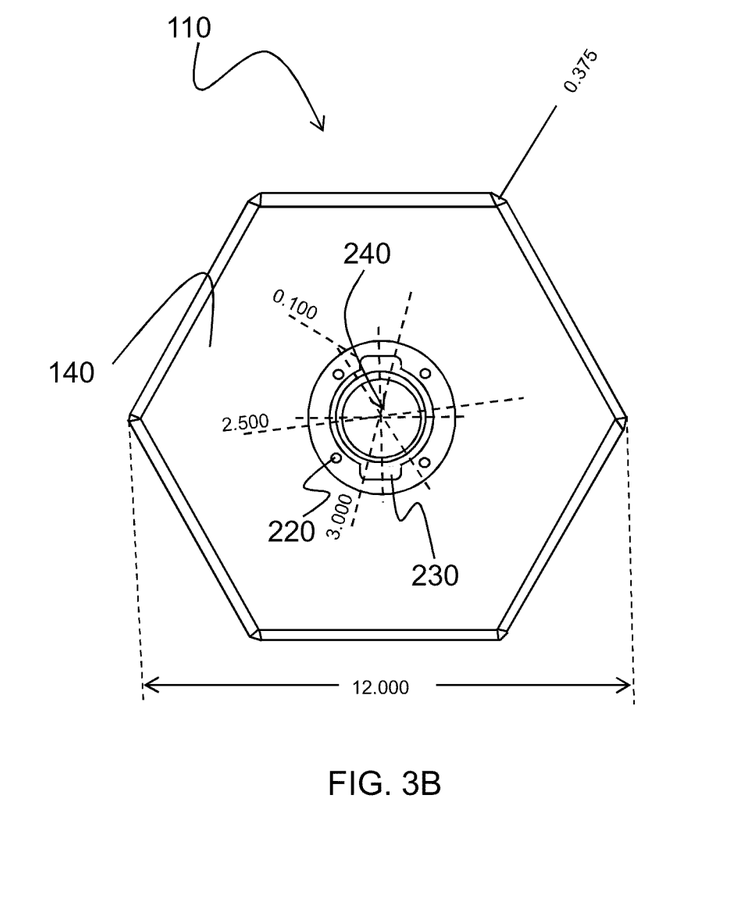
FIG. 3B is a top view of the base member of FIG. 3A showing the dimensions of a preferred embodiment.
Figure 3C:
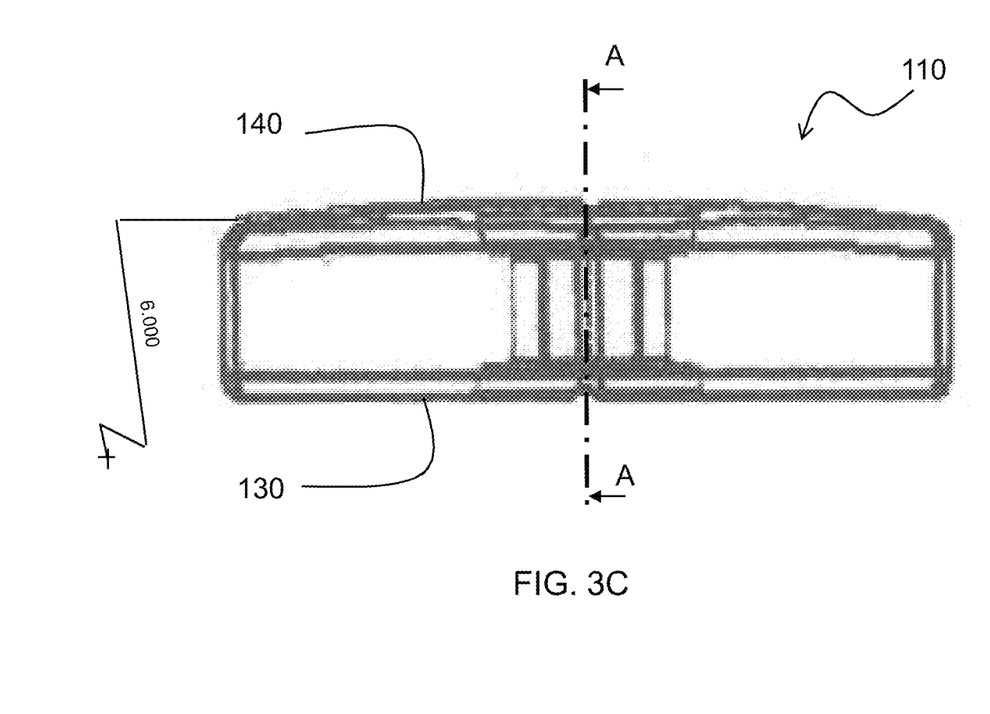
FIG. 3C is a side view of the base member of FIG. 3A.
Figure 3D:
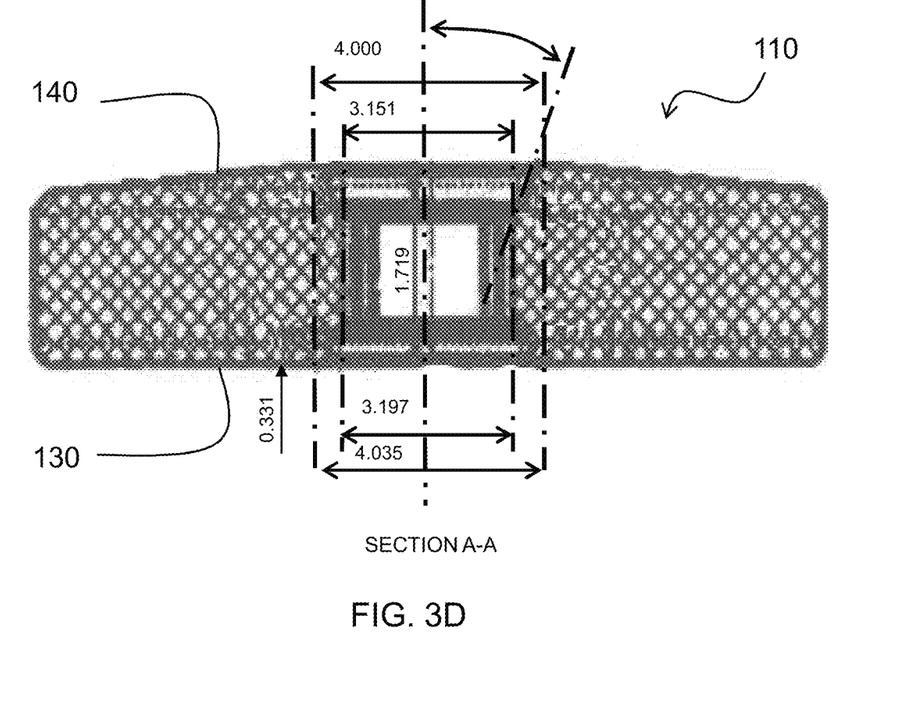
FIG. 3D is a cross-sectional view taken along line A-A of FIG. 3A of the base member of FIG. 3C.
Figure 3E:
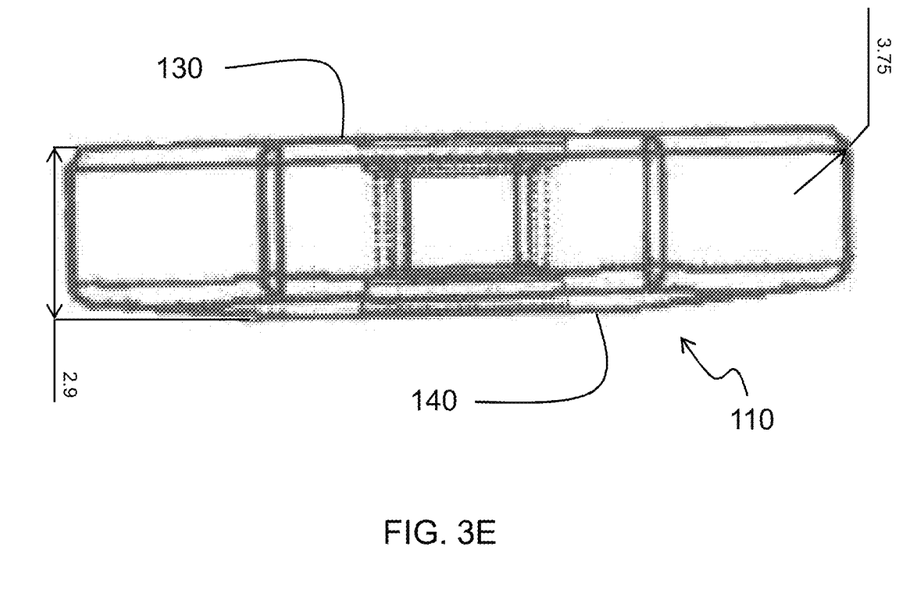
FIG. 3E is an additional side view of the base member of FIG. 3A showing the dimensions of a preferred embodiment.
Figure 4A:
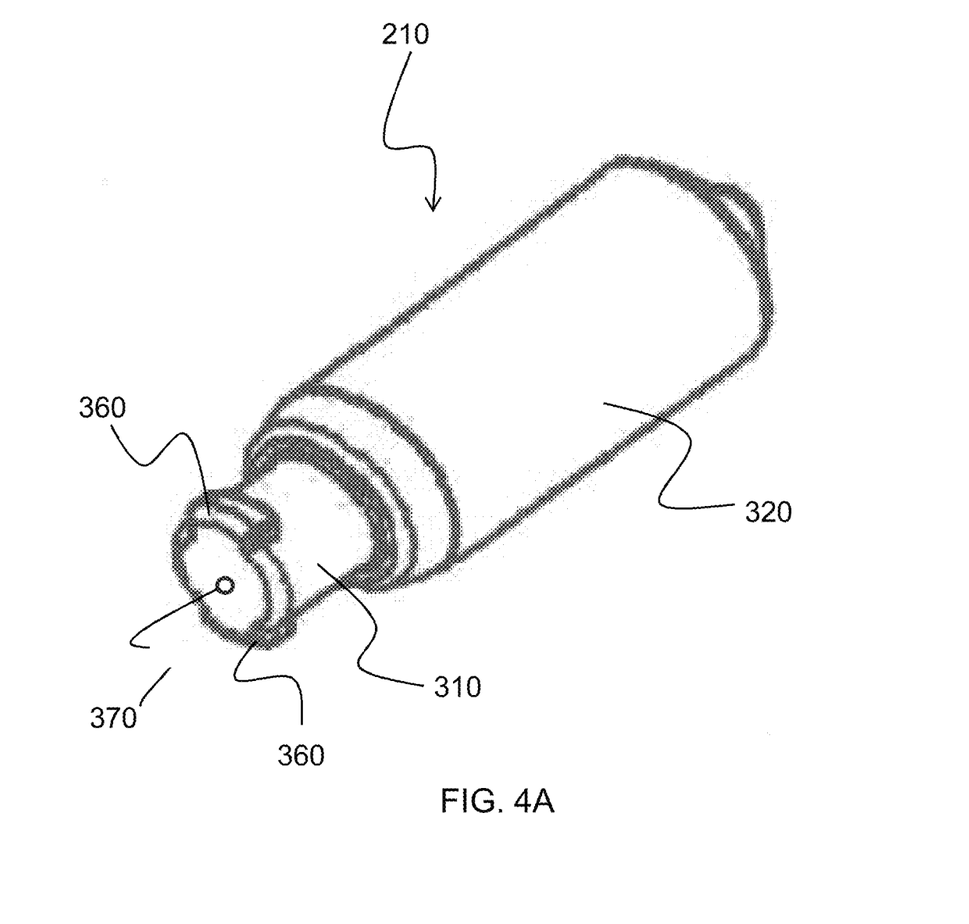
FIG. 4A is a perspective view of the anchor member of the buoyant water heating device of FIG. 1.
Figure 4B:
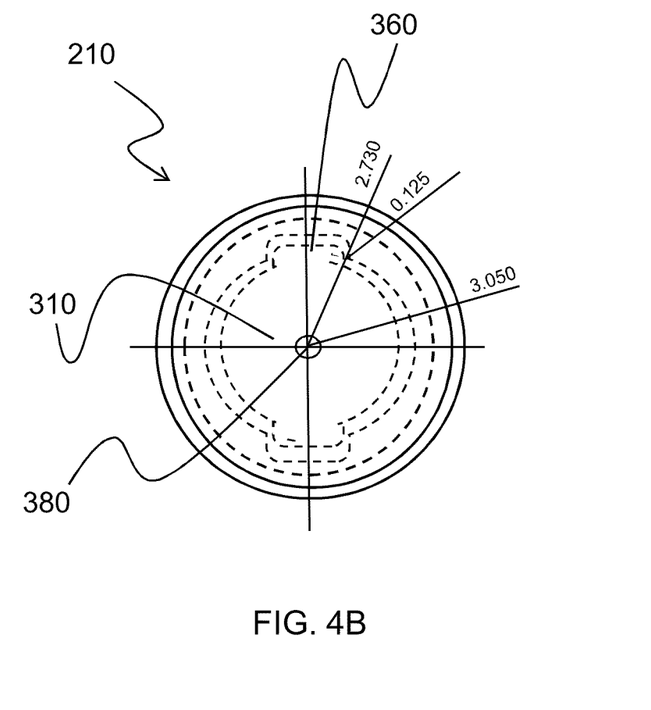
FIG. 4B is a top view of the anchor member of FIG. 4A showing the dimensions of a preferred embodiment.
Figure 4C:
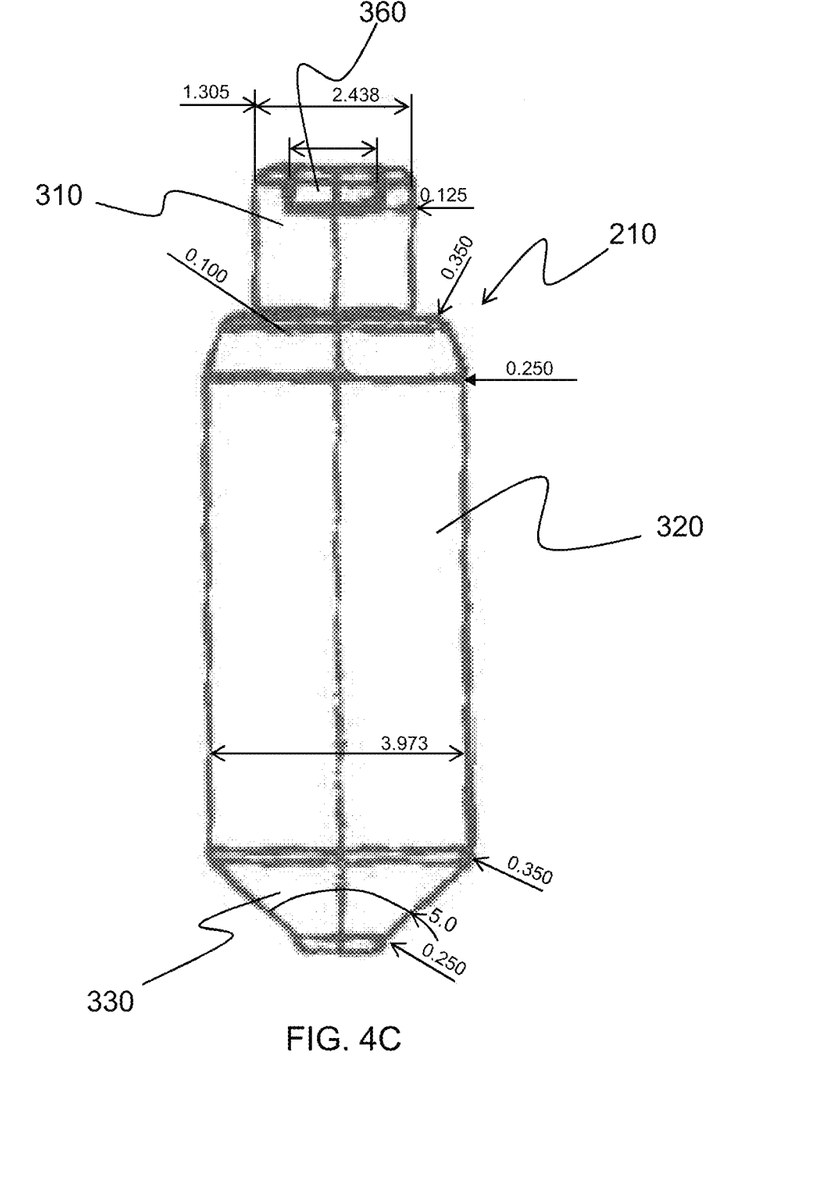
FIG. 4C is a side view of the anchor member of FIG. 4A showing the dimensions of a preferred embodiment.
Figure 4D:
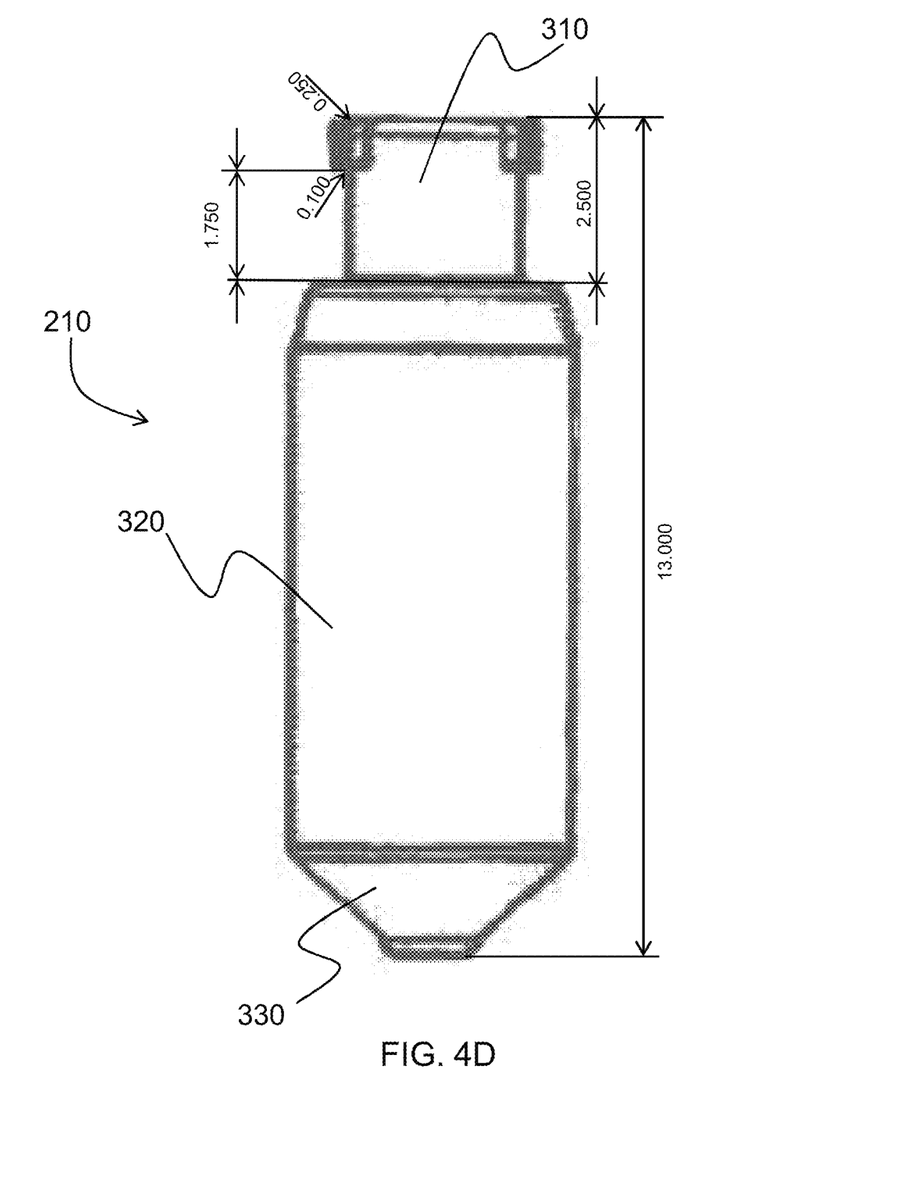
FIG. 4D is an additional side view of the anchor member of FIG. 4A showing the dimensions of a preferred embodiment.
Figure 5:
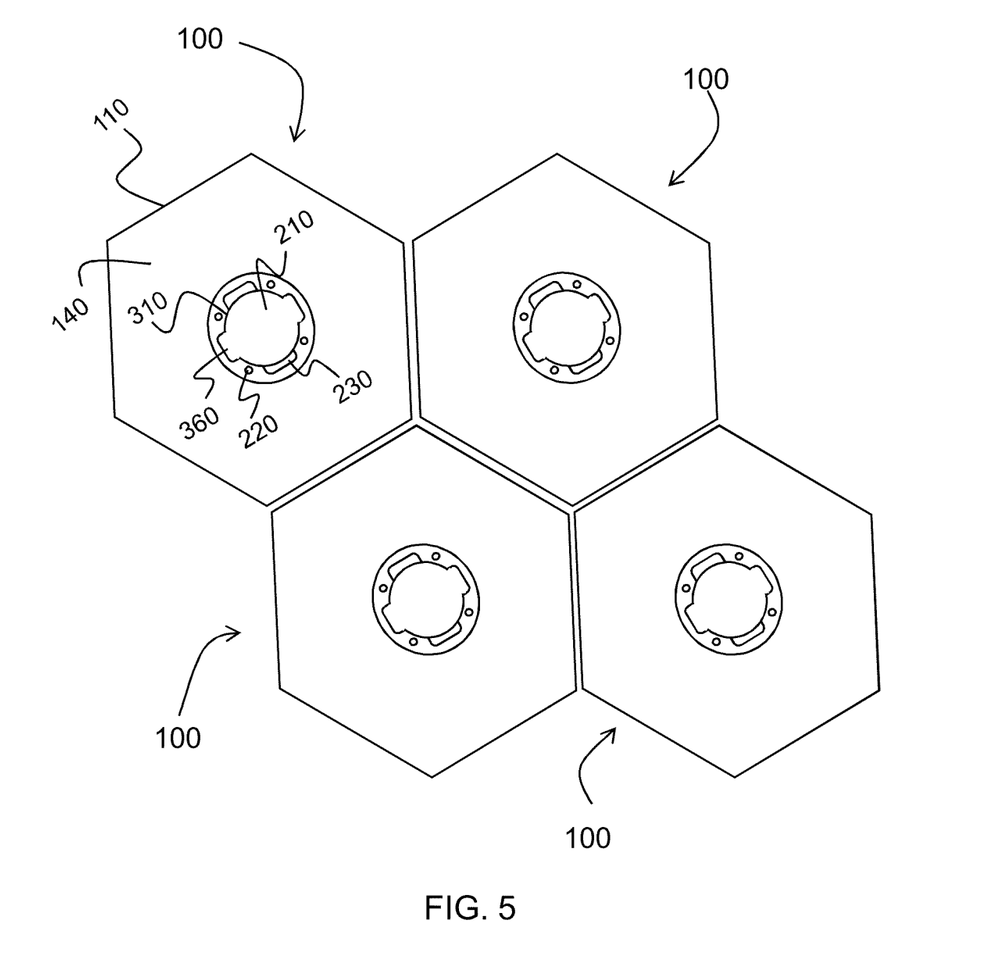
FIG. 5 is a top view of a hexagonal grid formed by multiple buoyant water heating devices on the surface of water or other liquid.

In a preferred embodiment, and as shown in FIGS. 3A and 3B, base member 110 is hexagonal-shaped. When multiple buoyant water heating devices 100 are used together, the devices will tend to float together, to create a hexagonal grid or tiling formed by a two-dimensional tessellation of the regular polygons of base members 110, as shown in FIG. 5. In alternate preferred embodiments, base member 110 may be shaped as a square or a triangle, to form the remaining two of the three possible regular tessellations. In still other embodiments, base member 110 may have any other shape, although other shapes, for example a circle, may not form such a close-packed lattice structure. In a preferred embodiment, the multiple buoyant water heating devices 100 are not physically coupled together, to allow easy access to the water without removing devices 100 by simply pushing one or more of the devices 100 out of the way.

Base member 110 and anchor member 210 are preferably made separately from plastic resin, and in particular, high density polyethylene, although other light-weight, waterproof materials may be used. In addition, base member 110 and anchor member 210 are preferably manufactured using a blow molding process, which serves to lower the per-unit cost of the device 100 as compared to the generally more expensive process of injection molding. When a blow molding process is used, the blow hole (not shown) is preferably located in the top surface 140 of base member 110, and should be sealed to ensure that water does not enter base member 110.

The blow hole (not shown) may be sealed by inserting a plug and gluing or sonic-sealing the plug in place. Alternatively, the blow hole may be sealed by heat-sealing excess plastic in the hole, or by other methods known in the art. Note that other methods of manufacturing, including but not limited to injection molding, may be used, although these methods may increase the per-unit cost of the device 100. While in alternate embodiments, device 100 may be manufactured as a single piece, manufacturing the base member 110 and anchor member 210 separately minimizes the space required to ship and/or store the devices 100.

In a preferred embodiment, base member 110 and anchor member 210 are colored black, which enables device 100 to absorb more solar energy, enhances the ultraviolet (UV) resistance of device 100, and may make the device 100 less obtrusive to the observer. The color black also functions to lower the per-unit cost of device 100, because the color black is typically the least expensive color to manufacture.

The present invention finds particular utility in pond remediation techniques which include bacterial treatments. Because sunlight is a fuel for algae, modern bioremediation techniques include bacterial treatments running concurrently with water dyes designed to block out light in order to inhibit the growth of algae while supporting the bacterial degradation and nutrient depletion effects of bacterial additives. Accordingly, the present invention can be formed of a light-opaque material, preferably black. Most preferably the material is light absorbing, as opposed to transmitting or reflecting. This prevents light from entering the water and the radiant energy is converted into thermal energy, heating the flotation element which then conducts the energy thermally to the cooler water. With a hexagonal flotation element and a cylindrical ballast element which fills with water to resist tipping caused by waves and/or wind, a hexagonal shape for the flotation element allows them to pack closely together in order to block sunlight from reaching the pond surface, and the modular nature allows the use of as many units as necessary to provide the desired coverage of any size or shape pond.

The claims should not be read as limited to the described order or elements unless stated to that effect. Therefore, all embodiments that come within the scope and spirit of the following claims and equivalents thereto are claimed as the invention.

What is claimed:

1. A method of heating a body of water, the steps comprising;
    forming a buoyant first member having an extended surface area into a tessellating shape;
    removably coupling the buoyant first member to a water filled second member; the water filled second member extending into the body of water to orient the extended surface area of the buoyant first member over the body of water;
    interlocking a protrusion of the water filled second member through an aperture within the buoyant first member;
    absorbing solar energy of the sun by the extended surface area of the buoyant first member;
    transferring absorbed solar energy as heat to the body of water.

2. The method of heating a body of water of claim 1 further comprising the step of distributing a plurality of the first and second members within the body of water to form a tiling pattern without gaps thereby holding absorbed heat of the water within the tiling pattern barrier.

3. A method of blocking light and transmitting radiant heat to a body of water comprising the steps:
    providing a plurality of devices having a buoyant base member removably coupled to a water-fillable anchor member, the buoyant base member formed of an opaque, light absorbing material; and
    placing on the body of water a sufficient number of the devices to cover the body of water.

4. The method of claim 3 wherein the anchor member further comprises a first port located in a lower portion of the anchor member and a second port located in the upper portion of the anchor member.

5. The method of claim 4, further comprising removable port adaptors sized to fit the first and second ports for providing user selectable flow rates of water through the first and second ports.

6. The method of claim 4, wherein the base member comprises a closed, hollow structure.

7. The method of claim 6, wherein the base member has a perimeter shape selected from square, hexagonal and triangular.

8. The method of claim 4 wherein the shape is hexagonal.

9. The method of claim 8 wherein the base member and anchor member are made of a high density waterproof plastic resin.

10. The method of claim 3, further comprising the step of performing a water bioremediation process which is enhanced by blocking light from entering the water.

11. The method of claim 10, wherein the water bioremediation process comprises selective bioremedial bacterial growth in the water.

* * * * *